United States Patent Office 3,246,901
Patented Apr. 19, 1966

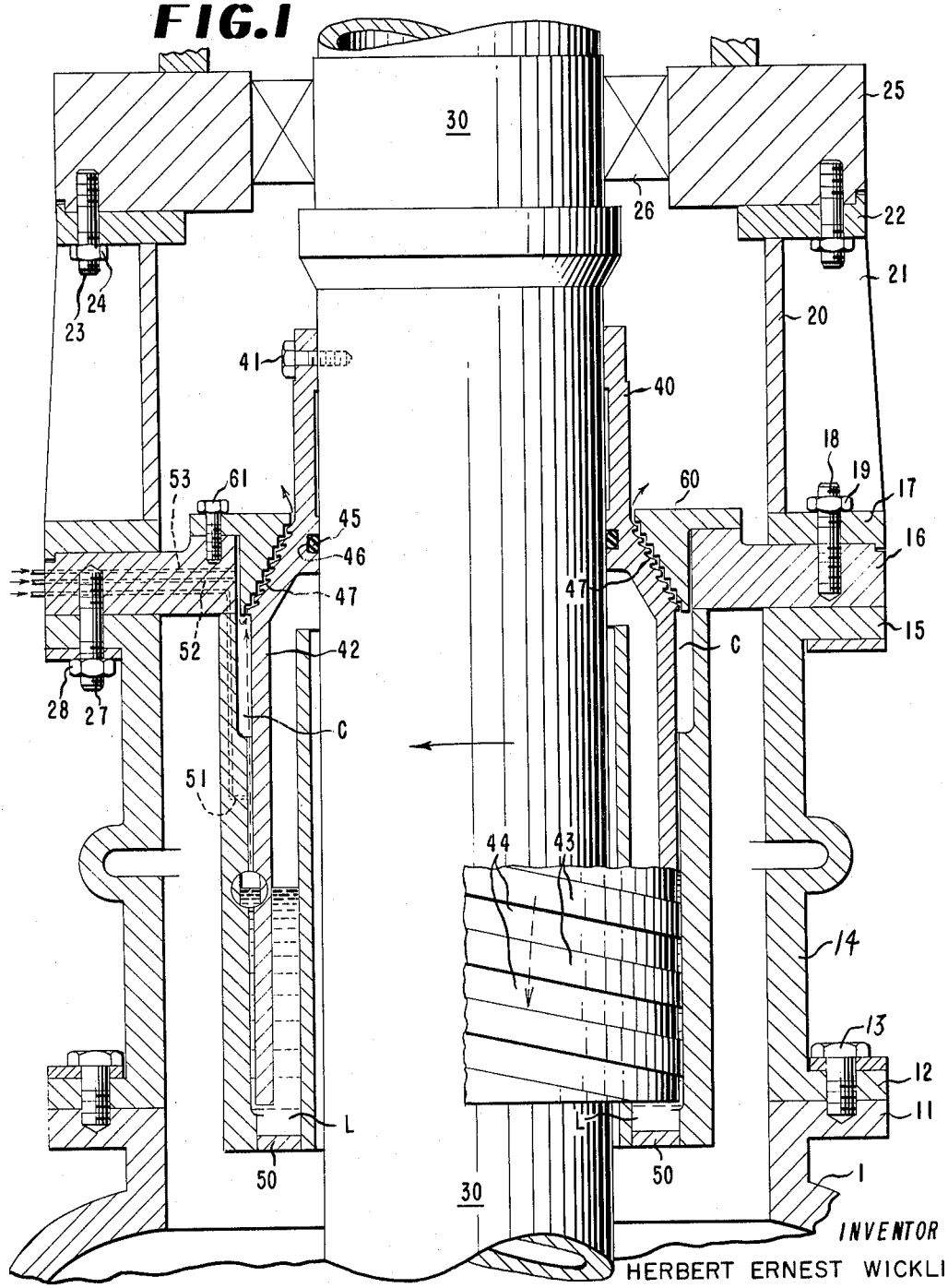

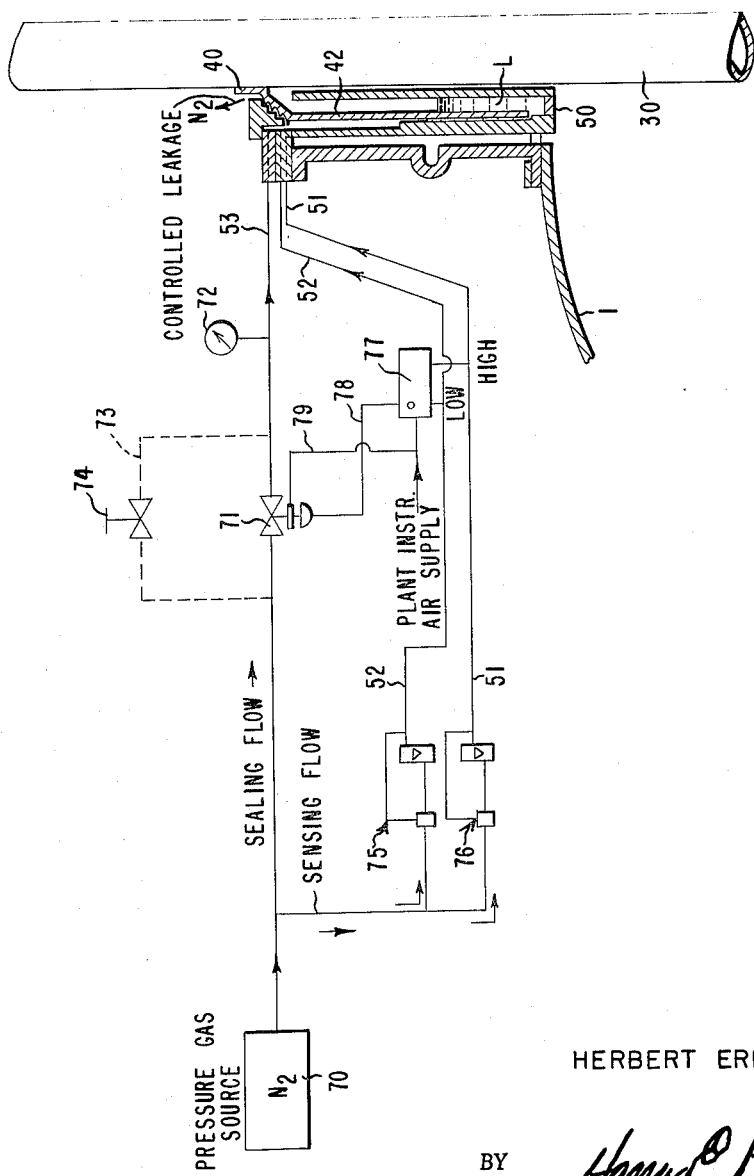

3,246,901
SEALING ARRANGEMENT FOR PREVENTING ESCAPE OF GAS ALONG A VERTICAL ROTATING SHAFT
Herbert Ernest Wickli, Newark, Del., assignor to E. I. du Pont de Nemours and Company, Wilmington, Del., a corporation of Delaware
Filed Apr. 2, 1963, Ser. No. 270,039
3 Claims. (Cl. 277—3)

This invention relates generally to shaft seals and to the provision of improved means for sealing vertical axis rotating shafts to prevent the escape of fluids along the shaft past a wall or casing in which the shaft extends. More specifically this invention involves an improved sealing arrangement ideally adapted for safely handling gases of a highly inflammable, highly toxic or dangerous nature.

It is one object of this invention to provide an improved vertical shaft seal arrangement which absolutely prevents leakage of a gas along a rotating shaft, has no rubbing parts, and which occupies a minimum of space.

It is another object of the invention to provide such a seal arrangement which comprises a safety feature which insures absolute sealing under wide pressure variations when the shaft is rotating as well as when rotation of the shaft ceases.

It is another object of the invention to provide such a seal arrangement which is simple, rugged in design, reliable and effective in operation, easy to repair and maintain, and relatively economical to produce.

It is another object of the invention to provide such a sealing arrangement which may be used with conventional apparatus and installations with minimum changes in the basic shaft or housing structures involved.

These objects are achieved in a sealing arrangement which generally comprises a housing or enclosed vessel adapted to contain a fluid under pressure, a substantially vertical shaft member extending through a portion of the vessel or housing and mounted for rotation about its axis, an annular cup unit concentrically disposed around the shaft member and arranged to contain an annular body of a viscous liquid, an annular sleeve unit concentrically disposed around the shaft member and extending into the cup unit and the body of liquid to form a sealing barrier against the contained fluid in the housing, one of the units being rigidly supported in fluid-tight relationship with the housing and the other unit being supported in fluid-tight relationship on said shaft member for rotation therewith, at least one of said units being provided with a helical liquid impelling means engaged in said body of liquid said impelling means operative upon rotation of the shaft to apply a force to said liquid sufficient to oppose the force exerted by the pressure fluid within the housing and prevent its escape along the shaft past the housing. Preferably the arrangement also comprises a safety means cooperating with the cup and sleeve units and the body of liquid, said safety means operative, in response to a predetermined displacement of the liquid in the cup unit under action of the fluid confined in the housing, to increase the force on the liquid to further oppose action of the fluid in the housing and prevent its escape, even when shaft rotation ceases.

Other objects and advantages will be apparent upon consideration of the following specifications and claims taken in conjunction with the accompanying drawings in which:

FIGURE 1 is a partial vertical cross-sectional view of a pressure vessel or housing intersected by a rotating shaft and provided with a sealing arrangement embodying features of the present invention, certain parts being broken away to more clearly illustrate the positioning and cooperation of parts.

FIGURE 2 is a partial schematic, partial sectional view showing the apparatus of FIGURE 1 in combination with the system for actuating and controlling the safety means or system for maintaining the seal in effective condition during exceptionally high pressure variations within the pressure vessel and during periods when the shaft rotation is stopped.

A preferred embodiment of the invention is shown in FIGURES 1 and 2 of the drawings. The housing 1 defines a pressure vessel or tank which contains a fluid under pressure, which fluid must be prevented from escaping from the vessel or tank. The vessel or tank shown in the drawings is provided with a shaft 30 extending through the housing 1 and mounted for rotation about its axis. In such an arrangement the shaft may be used to drive a work element such as an agitator (not shown) within the vessel. The major problem is that of providing for the rotation of the shaft while absolutely preventing leakage of the pressure fluid from the vesel which fluid, in many applications of this arrangement, is toxic, inflammable, or explosive.

As shown best in FIGURE 1, the housing 1 defining the pressure vessel is provided with an opening 2 which is surrounded by an outwardly extending flange 11. An elongated substantially vertically extending tubular casing element 14 is secured in position on housing 1 by bolts 13 connecting flanges 11 and 12. Secured to flange 15 at the upper end of tubular casing element 14 by stud bolts 27 and nuts 28 is a horizontal annular element 16. An annular support member 20, by means of another horizontal annular element 22 and annular block 25, all suitably secured in position, provides support, through bearing assembly 26, for the rotary shaft 30. Shaft 30 is operatively connected to a suitable conventional driving means (not shown).

An annular cup unit 50 is secured in fluid-tight relationship to the lower side of horizontal annular element 16 and contains in its lowermost portion an annular body of a viscous sealing liquid L. The sealing liquid may be a commercially available lubricating oil or of other suitable composition. The properties of the sealing liquid may, of course, vary widely as the other characteristics of the sealing arrangement are varied.

An annular sleeve unit, having a smaller diameter portion 40 closely fitting the shaft 30 and a larger diameter portion 42, is secured to the shaft 30 by bolts 41. A sealing ring 45 positioned in annular groove 46 in the shaft periphery maintains a fluid-tight seal between the annular sleeve unit and the shaft 30. The lower end 42 of annular sleeve unit extends downwardly into annular cup unit 50 and into the annular body of liquid L. The outer diameter of portion 42 of the annular sleeve unit is closely fitted to the maximum inner diameter of cup unit 50 as shown in FIGURE 1. The outer periphery of portion 42 of the annular sleeve unit is provided with helical lands 43 and grooves 44 which are arranged so that upon rotation of the shaft 30 in the direction indicated by the solid arrow a pumping action will take place in the liquid L between the lands and grooves and the adjacent wall of the cup unit 50 creating a pumping or impelling force or action generally in the direction indicated by the dotted arrow in FIGURE 1. This pumping action will oppose the action of the pressure fluid in housing 1 which acts on the surface of the liquid L inside the portion 42 of the annular sleeve unit 50. The viscosity of the liquid L, the clearance between the sleeve unit and the cup unit, the nature of the lands and grooves, the depths of immersion of the land and groove liquid impelling means, and the speed of rotation of the shaft 30 are selected to provide the desired sealing action.

It will be clear to those skilled in the art that the cup unit could be mounted in the shaft member 30 and the sleeve unit 40–42 could be mounted on the housing 1 without departing from the spirit of the invention.

As an illustrative example of a viscous liquid seal embodying the invention, a sealing arrangement having the following characteristics: a sealing liquid (lubricating oil—SAE 80) having a viscosity of about 115.0 c.p. at a 70° C. operating temperature, a wetted length of the helical impelling means of about twelve inches, a shaft rotation of about 70 r.p.m., a clearance between lands and the cup of about 0.02 inch, a maximum outer diameter of the sleeve unit of about 14 inches, a pitch angle in the helical liquid impelling lands and grooves of about 12°, a clearance between the grooves and the cup of about 0.063 inch, four lands, each of an axial length of about 1.1 inches and an axial length of grooves of about 1.1 inches, will be satisfactory in sealing against a contained fluid pressure of about 25 p.s.i., without significant heat dissipation problems.

Referring again to FIGURE 1 of the drawings it will be seen that an annular element 60 is mounted concentrically about shaft 30 and is secured to horizontal annular element 16 by means of bolts 61. A portion of annular element 60 cooperates with portion 49 of the annular sleeve unit to form an elongated annular chamber C surrounding the shaft member 30. Chamber C communicates at its lower end with the outer portion of the liquid L between the annular sleeve portion 42 and the outer wall of the cup unit. Chamber C communicates at its upper end with the surrounding atmosphere outside of the pressure vessel through the labyrinth seal 47 which forms a highly restricted annular orifice around the shaft.

As shown in FIGURE 1, a first passageway 51 is formed in cup unit 50 and element 16. This passageway 51 intersects chamber C and the annular cup unit at a point adjacent but spaced above the level of the liquid L in the cup unit. Another passageway 52 intersects chamber C at a point between the intersection of the first passageway with the chamber C and the labyrinth seal 47. Yet another passageway 53 also intersects chamber C between the intersection of the first passageway with the chamber C and the labyrinth seal 47.

Each of the passageways 51 and 52 are connected to a source of pressurized gas 70 through conventional rotometer type flow regulating devices 75 and 76. A conventional differential pressure measuring device 77 is connected across passageways 51 and 52 as shown. Passageway 53 is connected to source of pressurized gas 70 through a conventional control valve 71. The differential pressure measuring device 77 is operatively connected to actuate control valve 71 when a predetermined pressure differential exists between passageways 51 and 52. An additional control valve 74 may be connected in parallel with control valve 71. Additional control valve 74 is actuated to an open condition automatically upon a general failure of power to the apparatus for an accelerated energization of the safety arrangement. A pressure indicating device 72 is provided in passageway 53.

In operation under normal conditions, control valve 71 is closed and valve 74 is closed. A low controlled flow of the pressure gas, preferably nitrogen, is maintained through passageways 51 and 52. This flow is used to sense the level of the liquid in the outer portion of the cup unit outside the sleeve unit 40–42 and flows first into chamber C and bleeds off through the labyrinth seal 47 to the surrounding atmosphere. Under these conditions the pressures in passageways 51 and 52 will be substantially equal, or bear some known relationship to each other. When for some reason, such as fluctation of fluid pressure within housing 1 or stoppage of shaft rotation, the outer level of liquid in cup unit 50 is moved upwardly to the point where it blocks the intersection of passageway 51 with chamber C, the relationship between the pressures in passageways 51 and 52 will be changed. This will cause the differential measuring device 77, in a conventional manner, to generate a signal in accordance with the new pressure conditions in passageways 51 and 52 which will actuate control valve 71 to open to supply high pressure sealing gas to chamber C to increase the pressure on the outer portions of liquid L in the cup unit and maintain the liquid in position to prevent escape of the pressure fluid within housing 1. The pressure of the gas at source 70 must be maintained at a level sufficiently high to overcome all pressures which may forseeably be developed in housing 1. Under these conditions the level of the outer portion of liquid L in the cup unit will be pushed down by the sealing gas pressure until the relationship between the pressures of passageways 51 and 52 is returned to normal. An equilibrium condition will be established with the liquid kept at a certain level and sealing gas supplied at a given rate so that the pressure of the fluid in the housing 1 is effectively counterbalanced. In addition, the time of response of the safety system or means is such that it becomes effective well before liquid L is displaced to the point where it can no longer act as a sealing barrier.

The following are examples of the conventional major units used in the safety system:

Differential pressure measuring device 77; Model 15A Pressure Transmitter, Mftr: Foxboro Instrument Company Control valve 71; 1″ Cont. VA. with positioners, Mftr: Hammel-Dahl Company Flow regulating devices 75 and 76; Model 10A2135N–53RB4200, Mftr: Fisher and Porter Company It is believed that the construction and operation of the improved seal arrangement of this invention are clear from the above description. In addition, it is also believed to be clear that applicant has provided a novel, improved, and highly desirable sealing arrangement of great value in the handling of dangerous gases with maximum safety.

Although a single preferred embodiment of the invention has been described in accordance with the patent statute, many modifications and changes within the spirt of the invention will occur to those skilled in the art and all such are intended to fall within the scope of the following claims.

What is claimed is:

1. An improved sealing arrangement for a fluid-tight enclosure for preventing the escape of a pressurized gas from a fluid-tight enclosure in a given direction along a vertical rotating shaft past a stationary housing structure, said arrangement comprising in combination, a housing structure constructed and arranged to form a fluid-tight enclosure and adapted to contain a fluid under pressure, a substantially vertical shaft member extending through said housing structure and mounted for relative rotation, in a given direction and speed range, with respect thereto, an annular cup unit concentrically disposed around said shaft member and arranged to contain an annular body of a liquid in a given general position, an annular body of viscous liquid positioned in said cup unit, an annular sleeve unit concentrically disposed around said shaft member and extending into said cup unit and a given distance into the body of said liquid, one of said units supported in fluid-tight relationship on said housing structure and the other of said units supported in fluid-tight relationship on said shaft member for rotation therewith, one of said units provided with a helical liquid impelling means operatively engaged in the body of said liquid, said helical liquid impelling means constructed and arranged to have a sufficient dimension engaged in said liquid so that, upon relative rotation between said units in the given direction and speed range, a force is applied to the liquid to urge the liquid in a direction opposed to said given direction to prevent escape of the fluid under pressure within said housing structure while said rotation is maintained.

2. The improved arrangement of claim 1 which further comprises a fluid pressure safety means cooperating with said units and cooperating with said body of liquid and operative, in response to a predetermined displacement of the liquid away from said given position in the cup unit under action of the fluid under pressure in said housing structure, to increase the force on said body of liquid operating to prevent escape of the fluid under pressure in said housing structure.

3. The improved arrangement of claim 2 in which said fluid pressure safety means comprises an annular element mounted in fluid-tight relationship on said housing structure and in concentric relationship with said shaft member, said annular element cooperating with the structure of said shaft member and the structure of said cup element to form an elongated annular chamber surrounding said shaft member, said chamber communicating at one end with the liquid in the cup unit and at the other end communicating with the atmosphere outside the housing structure through a highly restricted annular orifice formed between said annular element and the structure of said shaft member, said chamber provided with a first sensing passageway intersecting said chamber at a point adjacent but spaced above the liquid in the cup unit and a second sensing passageway intersecting said chamber at a point spaced between said first sensing passageway and said restricted annular orifice, said first and second sensing passageways operatively connected to a source of pressurized gas, a pressure differential measuring device operatively connected across said first and second sensing passageways, a gas supply passageway intersecting said chamber between said first sensing passageway and said restricted annular orifice, said gas supply passageway connected through a control valve to a source of high pressure sealing gas, said pressure differential measuring device operatively connected to actuate said control valve to supply high pressure sealing gas into said chamber upon blockage of said first sensing passageway by rise of said liquid in said cup unit and said chamber, the pressure of said sealing gas in said chamber being sufficient to develop a force on said liquid to independently prevent escape of the pressure fluid from within said housing when rotation of said shaft is inoperative to prevent escape of the pressure fluid by the action of said helical liquid impelling means.

References Cited by the Examiner
UNITED STATES PATENTS 1,931,706 10/1933 Powell _____ 277—12
2,014,859 9/1935 Mitchell _____ 277—134

LAVERNE D. GEIGER, *Primary Examiner.*

SAMUEL ROTHBERG, *Examiner.*